US010449816B2

(12) United States Patent
Oh

(10) Patent No.: US 10,449,816 B2
(45) Date of Patent: Oct. 22, 2019

(54) BRACKET APPARATUS FOR COMPOSITE SPRING

(71) Applicants: Hyundai Motor Company, Seoul (KR); Kia Motors Corp., Seoul (KR)

(72) Inventor: Seung Hyun Oh, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 59 days.

(21) Appl. No.: 15/814,178

(22) Filed: Nov. 15, 2017

(65) Prior Publication Data
US 2019/0009628 A1 Jan. 10, 2019

(30) Foreign Application Priority Data

Jul. 5, 2017 (KR) .................. 10-2017-0085469

(51) Int. Cl.
*F16F 1/30* (2006.01)
*B60G 11/113* (2006.01)
*B60G 11/16* (2006.01)
*F16F 1/18* (2006.01)
*B60G 5/053* (2006.01)
*B60G 11/40* (2006.01)
*F16F 1/368* (2006.01)

(52) U.S. Cl.
CPC ............ *B60G 11/113* (2013.01); *B60G 5/053* (2013.01); *B60G 11/16* (2013.01); *B60G 11/40* (2013.01); *F16F 1/182* (2013.01); *F16F 1/30* (2013.01); *F16F 1/3683* (2013.01); *B60G 2202/143* (2013.01); *B60G 2204/121* (2013.01); *B60G 2204/125* (2013.01); *B60G 2204/43065* (2013.01); *B60G 2206/8207* (2013.01)

(58) Field of Classification Search
CPC ....... F16F 1/18; F16F 1/26; F16F 1/30; B60G 11/02; B60G 11/14; B60G 11/16; B60G 11/113
USPC ........ 267/6, 7, 23, 28, 29, 36.1, 38–53, 151, 267/136; 188/379; 248/632–638
See application file for complete search history.

(56) References Cited

U.S. PATENT DOCUMENTS

| | | | | |
|---|---|---|---|---|
| 1,718,545 A * | 6/1929 | Doster | ...................... | F16F 1/22 184/14.1 |
| 2,552,379 A * | 5/1951 | Perez | ...................... | B60G 11/36 267/28 |
| 3,814,357 A * | 6/1974 | Rontgen | .................. | F16F 1/128 248/573 |
| 4,598,900 A * | 7/1986 | Yamamoto | ............ | B29C 53/562 267/149 |

(Continued)

FOREIGN PATENT DOCUMENTS

KR 1998-054432 U 10/1998
KR 10-2011-0060146 A 6/2011
(Continued)

*Primary Examiner* — Christopher P Schwartz
(74) *Attorney, Agent, or Firm* — Morgan, Lewis & Bockius LLP

(57) ABSTRACT

A bracket apparatus for a composite spring, may include a lower bracket disposed to come into contact with a composite spring when a U-bolt is fastened to a nut; an upper bracket disposed above the lower bracket so as not to be decoupled therefrom by the nut; and an elastic member disposed between the lower bracket and the upper bracket to provide a force such that the lower and upper brackets move away from each other.

5 Claims, 7 Drawing Sheets

(56) References Cited

U.S. PATENT DOCUMENTS

| | | | | |
|---|---|---|---|---|
| 4,630,804 A | * | 12/1986 | Fesko | B60G 11/113 |
| | | | | 264/149 |
| 4,895,350 A | * | 1/1990 | Schoof | B60G 11/113 |
| | | | | 267/52 |
| 5,035,406 A | * | 7/1991 | Sellers | B60G 11/10 |
| | | | | 267/265 |
| 6,443,273 B1 | * | 9/2002 | Ledbetter | B64C 27/001 |
| | | | | 188/379 |
| 2011/0221105 A1 | * | 9/2011 | Henksmeier | B60G 9/003 |
| | | | | 267/52 |

FOREIGN PATENT DOCUMENTS

| | | |
|---|---|---|
| KR | 10-2012-0053199 A | 5/2012 |
| KR | 10-1349014 B1 | 1/2014 |

* cited by examiner

BRACKET APPARATUS FOR COMPOSITE SPRING

CROSS REFERENCE TO RELATED APPLICATION

The present application claims priority of Korean Patent Application No. 10-2017-0085469 filed on Jul. 5, 2017, the entire contents of which is incorporated herein for all purposes by this reference.

BACKGROUND OF THE INVENTION

Field of the Invention

The present invention relates to a bracket apparatus for a composite spring, and, more particularly, to a bracket apparatus for a composite spring, configured for preventing a reduction in axial force of a U-bolt, which may occur due to contraction of a composite spring, in a rear-wheel two-axle suspension system having the composite spring.

Description of Related Art

A heavy-duty truck including a dump truck has two axles applied to the rear wheels thereof for traveling on an unpaved rough road so that the axles support the same load.

The rear-wheel suspension system of the heavy-duty truck having the two axles at the rear wheels thereof includes a pair of rubber springs that are respectively coupled to a rear-wheel-side front axle and a rear-wheel-side rear axle, and a spring member which is disposed in forward and rearward directions so that both end portions thereof are connected to the rubber springs.

A trunnion base having a trunnion shaft is positioned at the longitudinal middle portion of the spring member, and the trunnion base is assembled to a vehicle body frame. A U-bolt saddle (under saddle or lower saddle) is rotatably assembled to the trunnion shaft, and the U-bolt saddle and a spring bracket (upper saddle) are fixedly fastened together to the middle portion of the spring member with a U-bolt and a nut.

The spring member may be a multi-leaf spring including a steel material, or be a single composite spring including a glass fiber or a carbon fiber. The steel multi-leaf spring is advantageous in that it secures durability for the price, and the composite spring is advantageous in that it reduces weight and improves fuel efficiency.

Meanwhile, the composite spring has a characteristic that its volume largely varies depending on temperature, compared to the steel multi-leaf spring. In a low temperature of about −20° C. or less, the volume of the composite spring is significantly decreased as the contraction rate of the composite spring is increased.

Accordingly, in the rear-wheel two-axle suspension system that utilizes the steel U-bolt mixed with the glass fiber composite spring, when the volume (thickness) of the composite spring is decreased due to the contraction of the composite spring according to the change in atmospheric temperature, the axial force of the U-bolt may be reduced. For the present reason, peripheral suspension parts including the composite spring may be out of position and the durability thereof may be sharply deteriorated.

The foregoing is intended merely to aid in the understanding of the background of the present invention, and is not intended to mean that the present invention falls within the purview of the related art which is already known to those skilled in the art.

The information included in the present Background of the Invention section is only for enhancement of understanding of the general background of the invention and may not be taken as an acknowledgment or any form of suggestion that the present information forms the prior art already known to a person skilled in the art.

BRIEF SUMMARY

Various aspects of the present invention are directed to providing a bracket apparatus for a composite spring, having a structure in which a vertical length of the bracket apparatus disposed to come into contact with a composite spring is automatically increased when a volume (thickness) of the composite spring is decreased due to contraction of the composite spring according to the change in atmospheric temperature, to prevent a reduction in axial force of a U-bolt by preventing formation of a gap between the composite spring and the bracket apparatus disposed thereon, and further to prevent a phenomenon, in which peripheral suspension parts including the composite spring are out of position, and achieve an improvement in durability thereof In accordance with an aspect of the present invention, a bracket apparatus for a composite spring includes a lower bracket disposed to come into contact with a composite spring when a U-bolt is fastened to a nut, an upper bracket disposed above the lower bracket so as not to be decoupled therefrom by the nut, and an elastic member disposed between the lower bracket and the upper bracket to provide a force such that the lower and upper brackets move away from each other.

The U-bolt may simultaneously pass through the lower and upper brackets, and then an end portion thereof may protrude upwards from the upper bracket, and the nut may be fastened to the end portion of the U-bolt to come into contact with an upper surface of the upper bracket.

The elastic member may include a plurality of compression springs, both end portions of each of which are supported by the lower and upper brackets.

The lower and upper brackets may have installation grooves formed in their respective upper and lower surfaces for installation of the elastic member, both end portions of the elastic member being respectively fitted into the installation grooves.

The upper bracket may has an insertion groove formed in a lower surface thereof so that a portion of an upper portion of the lower bracket is inserted into the insertion groove, and the portion of the upper portion of the lower bracket may be inserted into the upper bracket through the insertion groove.

When the composite spring is contracted according to a change in atmospheric temperature so that its thickness is decreased and a gap is formed between the composite spring and the lower bracket due to the decrease in thickness of the composite spring, the lower bracket may move toward the composite spring by a restoring force of the elastic member to be maintained in a state in which it is always in contact with the composite spring, removing the gap between the composite spring and the lower bracket.

As apparent from the above description, in a rear-wheel two-axle suspension system including a glass fiber composite spring and a steel U-bolt together, when the thickness (volume) of the composite spring is decreased due to the contraction of the composite spring according to the change in atmospheric temperature, namely in a low atmospheric temperature, a lower bracket of a bracket apparatus disposed on the composite spring moves toward the composite spring by the elastic force of an elastic member to be maintained in a state in which it is always in contact with the composite spring. Therefore, it is possible to prevent a reduction in axial force of the U-bolt by removing a gap formed between the composite spring and the lower bracket, and further to prevent a phenomenon, in which peripheral suspension parts including the composite spring are out of position, and achieve an improvement in durability thereof The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
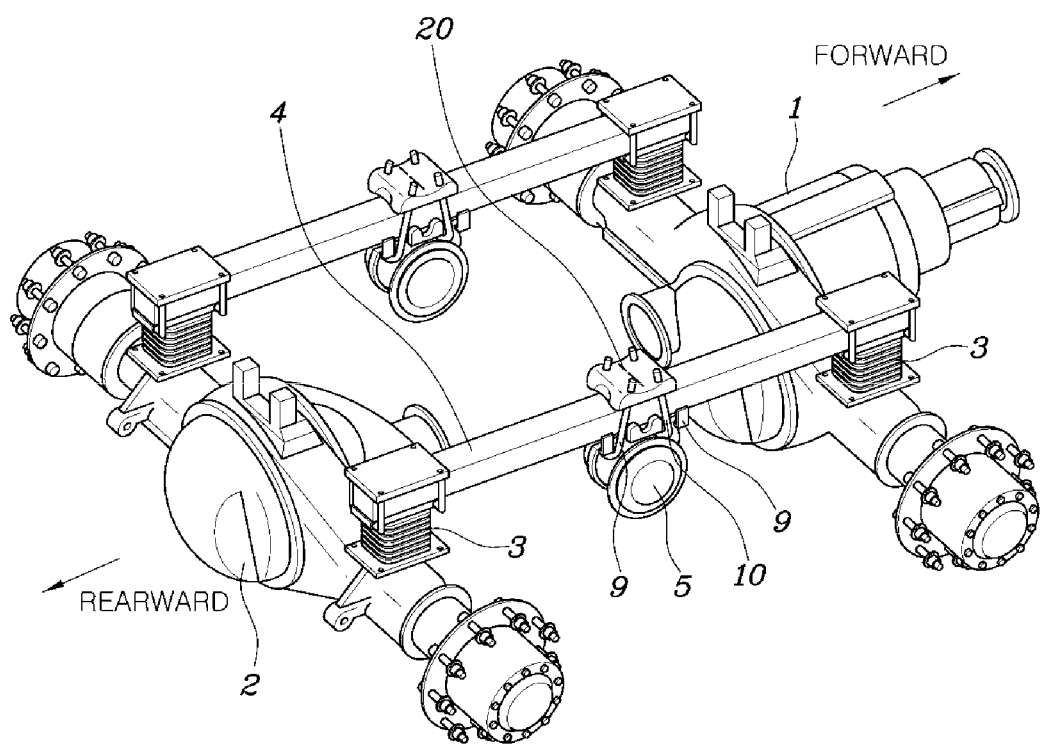
FIG. 1 and FIG. 2 are perspective views illustrating a rear-wheel two-axle suspension system including a bracket apparatus for a composite spring according to an exemplary embodiment of the present invention.
Figure 2:
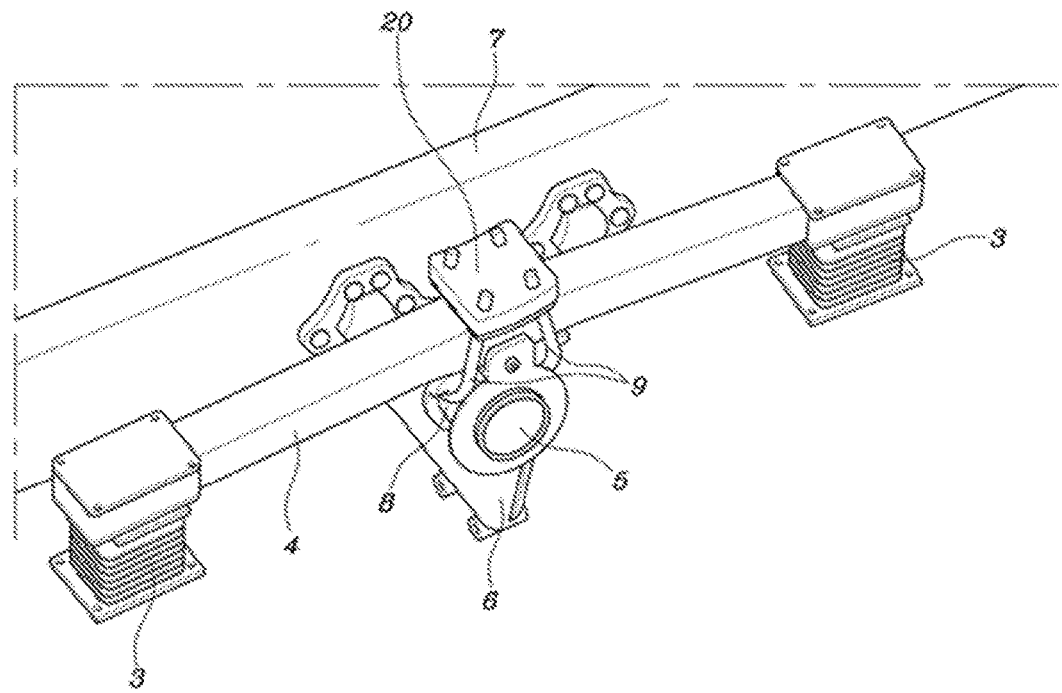
Figure 3:
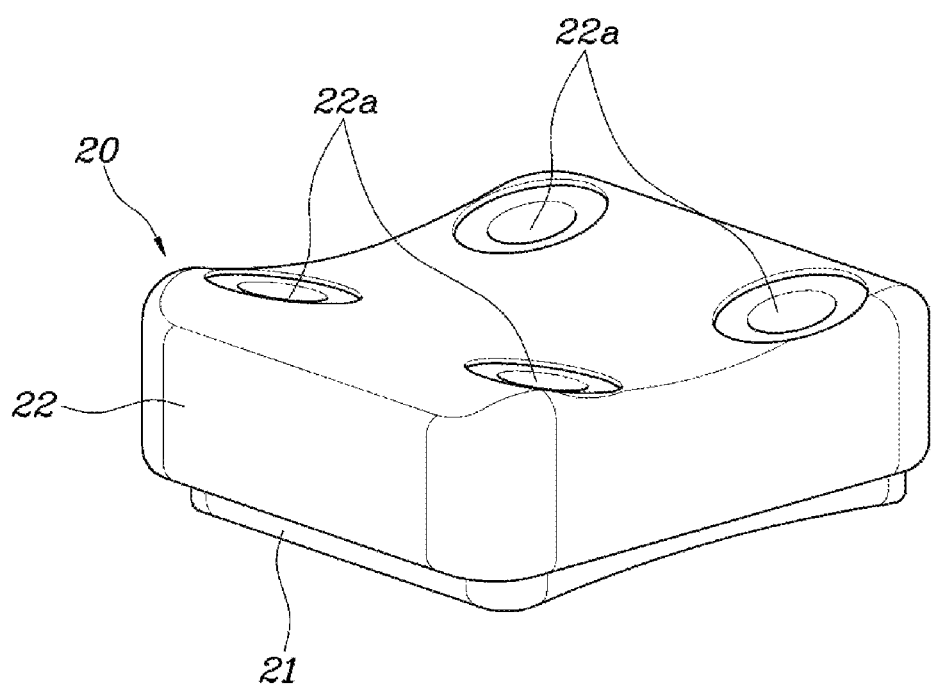
FIG. 3 and FIG. 4 are an assembled perspective view and an exploded perspective view illustrating the bracket apparatus for a composite spring according to the exemplary embodiment of the present invention.
Figure 4:
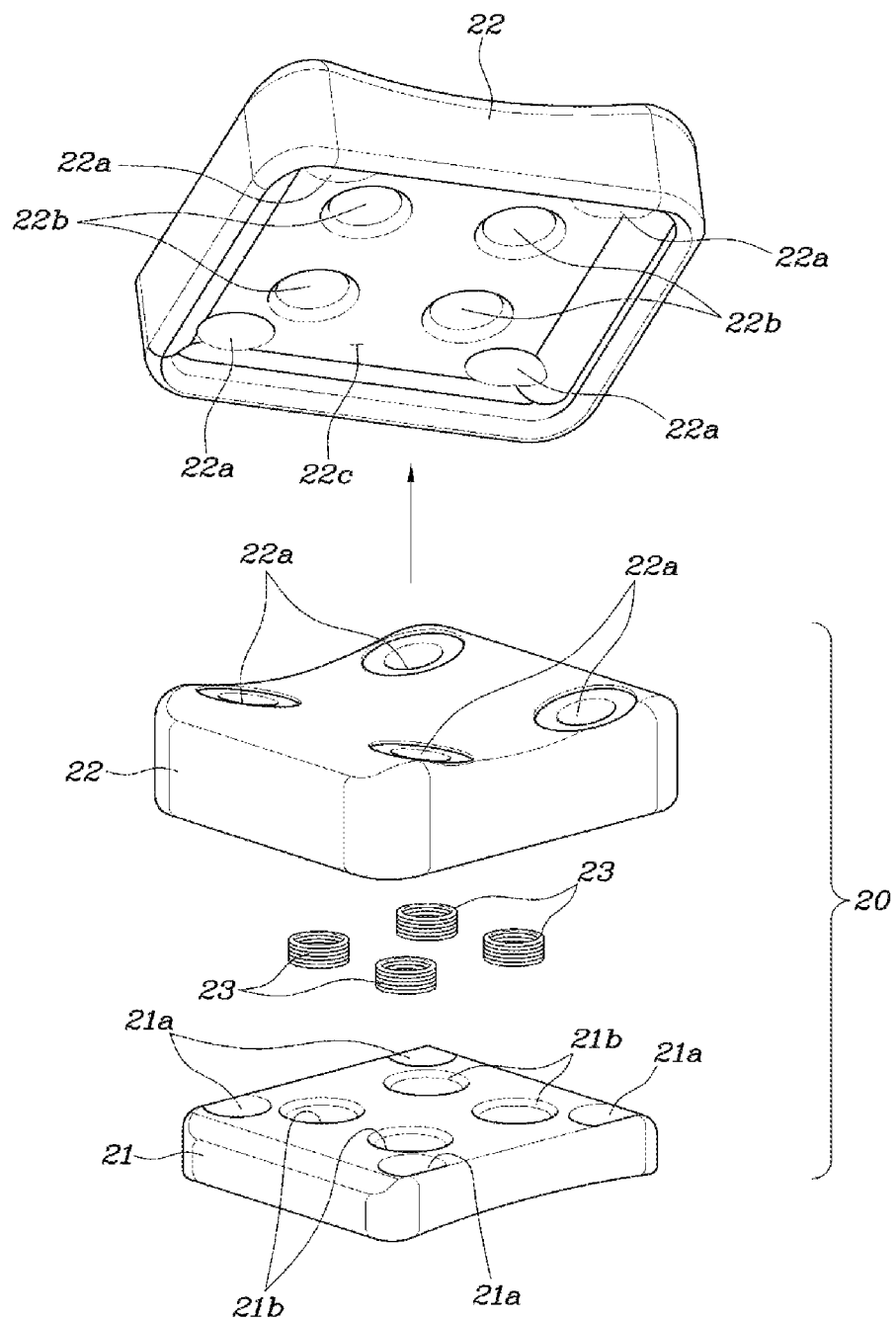

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in portion by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments, on the contrary, the invention(s) is/are intended to cover not only the exemplary embodiments, but also various alternatives, modifications, equivalents and other embodiments, which may be included within the spirit and scope of the invention as defined by the appended claims.

A bracket apparatus for a composite spring according to the exemplary embodiments of the present invention will be described below with reference to the accompanying drawings.

As illustrated in FIGS. 1 to 5A to 5C, a rear-wheel suspension system of a heavy-duty truck having two axles at rear wheels thereof includes a pair of rubber springs 3 that are respectively coupled to a rear-wheel-side front axle 1 and a rear-wheel-side rear axle 2, and a composite spring 4 which is disposed in forward and rearward directions so that both end portions thereof are connected to the rubber springs 3.

The composite spring 4 is a single component including a glass fiber or a carbon fiber.

A trunnion base 6 having a trunnion shaft 5 is positioned at the longitudinal middle portion of the composite spring 4, and the trunnion base 6 is assembled to a vehicle body frame 7. A U-bolt saddle 8 is rotatably assembled to the trunnion shaft 5, and the U-bolt saddle 8 and a bracket apparatus 20 are fixedly fastened together to the middle portion of the composite spring 4 with a U-bolt 9 and a nut 10.

The composite spring 4 has a characteristic that its volume largely varies depending on temperature, compared to a multi-leaf spring including a steel material. In a low temperature of about −20° C. or less, the volume, namely the vertical thickness, of the composite spring is significantly decreased in a height direction as the contraction rate of the composite spring is increased.

When the composite spring 4 is contracted and the volume thereof is decreased in the height direction, the axial force of the steel U-bolt 9 is reduced, which may lead to a phenomenon, in which peripheral suspension parts are out of position, and a sharp deterioration in durability thereof When the composite spring 4 is contracted according to the change in atmospheric temperature and the volume thereof is decreased in the height direction, the bracket apparatus 20 according to the exemplary embodiment of the present invention removes the gap between the composite spring 4 and the bracket apparatus 20 since the volume of the bracket apparatus 20 is increased in the height direction thereof. Thus, it is possible to prevent the reduction in axial force of the U-bolt 9 and to further improve the durability of the suspension system.

To the present end, the bracket apparatus 20 according to the exemplary embodiment of the present invention is accommodated on the composite spring 4 by the fastening force of the U-bolt 9 and the nut 10, while the U-bolt 9 passes through the bracket apparatus 20.

That is, the bracket apparatus 20 according to the exemplary embodiment of the present invention includes a lower bracket 21 which is disposed to come into contact with the composite spring 4 when the U-bolt 9 is fastened to the nut 10, an upper bracket 22 which is disposed above the lower bracket 21 so as not to be decoupled therefrom by the nut 10, and an elastic member 23 which is disposed between the lower bracket 21 and the upper bracket 22 and provides a force such that the lower and upper brackets 21 and 22 move away from each other.

The U-bolt 9 simultaneously passes through the lower and upper brackets 21 and 22, and then the end portion thereof protrudes upwards from the upper bracket 22. The nut 10 is fastened to the end portion of the U-bolt 9 to come into contact with the upper surface of the upper bracket 22.

The respective lower and upper brackets 21 and 22 have bolt holes 21a and 22a for the pass of the U-bolt 9.

The elastic member 23 preferably includes a plurality of compression springs, both end portions of each of which are supported by the lower and upper brackets 21 and 22, but the present invention is not limited thereto.

That is, the lower and upper brackets 21 and 22 move downward and upward, respectively, by the elastic force of the elastic member 23 disposed between the lower bracket 21 and the upper bracket 22. Accordingly, any member may be used other than the elastic member 23 as a compression spring as long as it provides a force such that the lower and upper brackets 21 and 22 move away from each other.

The lower and upper brackets 21 and 22 have installation grooves 21b and 22b formed in the respective upper and lower surfaces thereof for installation of the elastic member 23, and both end portions of the elastic member 23 are respectively fitted into the installation grooves 21b and 22b, controlling the disposition location of the elastic member 23.

The upper bracket 22 has an insertion groove 22c formed in the lower surface thereof so that a portion of the upper portion of the lower bracket 21 is inserted into the insertion groove 22c, with the consequence that the portion of the upper portion of the lower bracket 21 is inserted into the upper bracket 22 through the insertion groove 22c. Thus, it is possible to minimize a space restriction on installation by reducing the external size, i.e. The vertical size, of the bracket apparatus 20.

In the exemplary embodiment of the present invention, when the composite spring 4 is contracted according to the change in atmospheric temperature so that the thickness thereof is decreased, and a gap C1 is formed between the composite spring 4 and the lower bracket 21 due to the decrease in thickness of the composite spring 4, the lower bracket 21 moves toward the composite spring 4 by the restoring force of the elastic member 23 to be maintained in a state in which it is always in contact with the composite spring 4. Through such a structure, it is possible to remove the gap C1 between the composite spring 4 and the lower bracket 21 and to prevent the reduction in axial force of the U-bole 9.

Hereinafter, the operation of the bracket apparatus according to the exemplary embodiment of the present invention will be described.

In the rear-wheel two-axle suspension system including the glass fiber composite spring 4 and the steel U-bolt 10 together, when the vertical thickness (volume) of the composite spring 4 is decreased in the height direction due to the increased contraction rate thereof in a low atmospheric temperature of −20° C. or less.

Figure 5A:
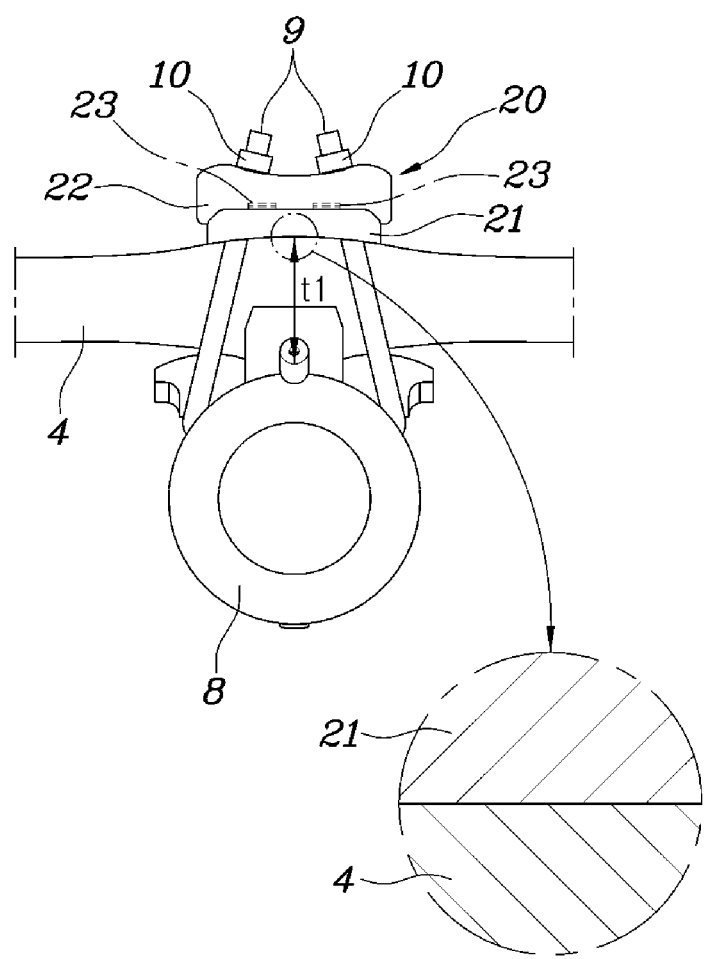
FIG. 5A, FIG. 5B, and FIG. 5C are views for explaining the operation of the bracket apparatus for a composite spring according to the exemplary embodiment of the present invention.

That is, FIG. 5A illustrates a normal state in which the contraction of the composite spring 4 is not affected by atmospheric temperature, in which case the thickness (volume) of the composite spring 4 in the vertical (height) direction thereof is initially in a t1 state on the basis of the fastening portion of the U-bolt 9, and the constituent lower bracket 21 of the bracket apparatus 20 is maintained in a state in which it is in contact with the composite spring 4 by the elastic force of the elastic member 23.

Figure 5B:
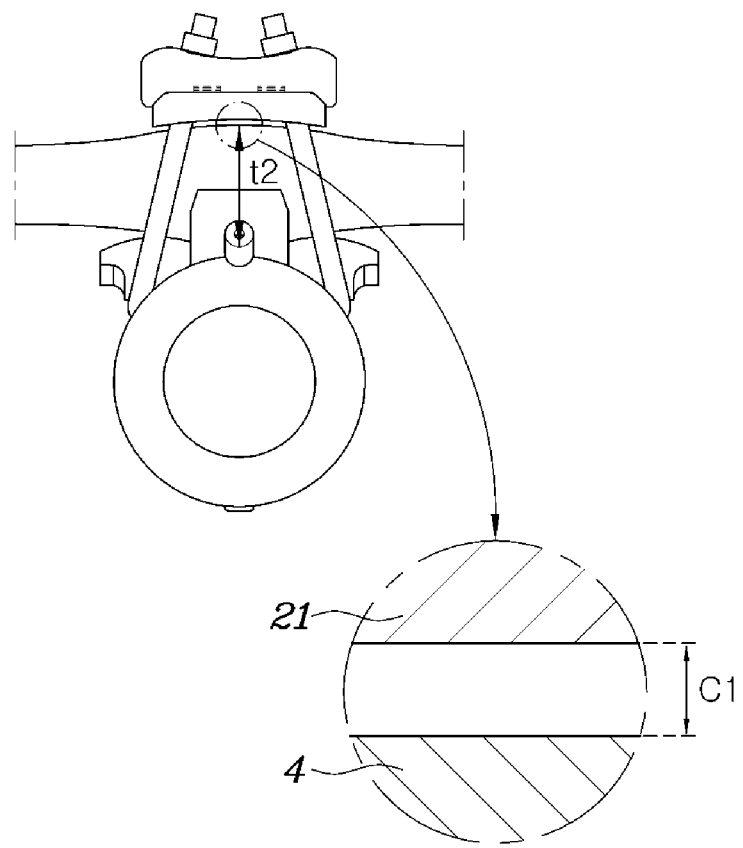

In the low atmospheric temperature of −20° C. or less in the state of FIG. 5A, the composite spring 4 is contracted and the thickness (volume) thereof in the vertical (height) direction thereof is decreased from t1 to t2 as in FIG. 5B, in which case a gap C1 is formed by the decreased thickness of the composite spring 4 between the composite spring 4 and the lower bracket 21.

Figure 5C:
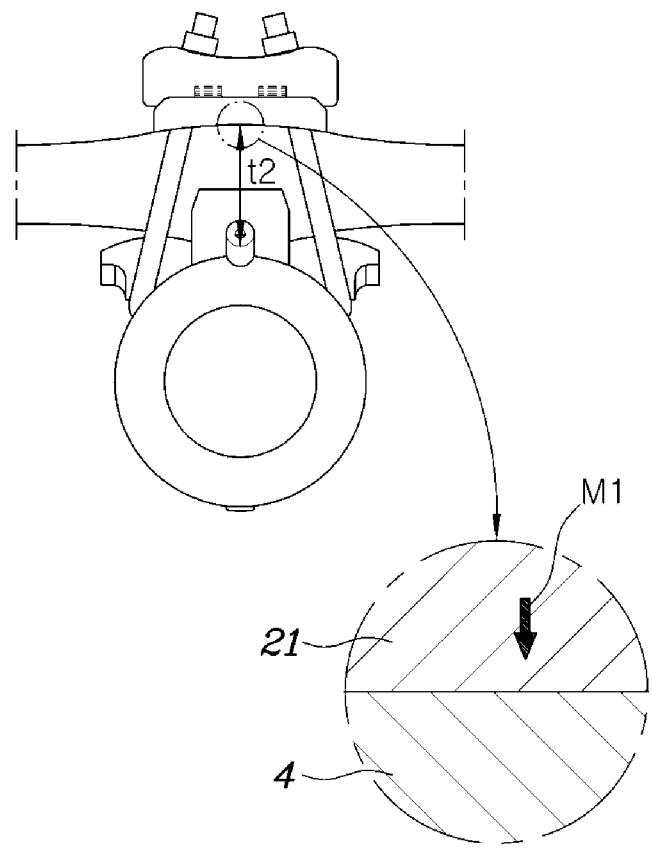

When the thickness (volume) of the composite spring 4 is decreased from t1 to t2 according to the change in atmospheric temperature and the gap C1 is formed between the composite spring 4 and the lower bracket 21, the elastic member 23 is increased in length, removing the gap C1 by further movement of the lower bracket 21 toward the composite spring 4 (in the direction of an arrow M1) as in FIG. 5C. As a result, the lower bracket 21 of the bracket apparatus 20 may be maintained in a state in which it is always in contact with the upper surface of the composite spring 4.

The overall dimension of the bracket apparatus 20 in the vertical (height) direction thereof in the state of FIG. 5C is greater than that in the state of FIG. 5A.

As described above, when the thickness (volume) of the composite spring 4 is decreased from t1 to t2 in a low temperature and a gap C1 is formed between the composite spring 4 and the lower bracket 21 by a difference between t1 and t2, the constituent lower bracket 21 of the bracket apparatus 20 moves toward the composite spring 4 by the elastic member 23 to be maintained in a state in which it is always in contact with the composite spring 4, removing the gap C1. Thus, it is possible to prevent a reduction in axial force of the U-bolt 9 even though the thickness (volume) of the composite spring 4 is decreased in the low temperature, and further to prevent a phenomenon, in which the peripheral suspension parts are out of position, and achieve an improvement in durability thereof.

When the atmospheric temperature is increased from a low temperature, the contracted composite spring 4 is expanded and returned to have the initial thickness t1 as in FIG. 5A. Thus, the lower bracket 21 of the bracket apparatus 20 is further inserted into the upper bracket 22 so that the vertical height thereof is decreased.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bracket apparatus for a composite spring, the bracket apparatus comprising:
   a lower bracket disposed to contact with the composite spring when a U-bolt is fastened to a nut;
   an upper bracket disposed above the lower bracket so as not to be decoupled therefrom by the nut; and
   an elastic member disposed between the lower bracket and the upper bracket to provide a force such that the lower and upper brackets move away from each other,
   wherein, when the composite spring is contracted according to a changed in atmospheric temperature so that a thickness of the composite spring is decreased and a gap is formed between the composite spring and the lower bracket due to a decrease in the thickness of the composite spring, the lower bracket moves toward the composite spring by restoring force of the elastic member to be maintained when the lower bracket is continuously in contact with the composite spring, removing the gap between the composite spring and the bracket.

2. The bracket apparatus according to claim 1, wherein the U-bolt passes through the lower and upper brackets, and then an end portion thereof is protrudingly formed upwards from the upper bracket; and
   the nut is fastened to the end portion of the U-bolt to contact with an upper surface of the upper bracket.

3. The bracket apparatus according to claim 1, wherein the elastic member includes a plurality of compression springs, first and second end portions of each of which are supported by the lower and upper brackets.

4. The bracket apparatus according to claim 1, wherein the lower and upper brackets have installation grooves formed in respective upper and lower surfaces thereof for installation of the elastic member, first and second end portions of the elastic member being respectively fitted into the installation grooves.

5. The bracket apparatus according to claim 1, wherein
the upper bracket has an insertion groove formed in a lower surface thereof wherein a portion of an upper portion of the lower bracket is inserted into the insertion groove; and
the portion of the upper portion of the lower bracket is inserted into the upper bracket through the insertion groove.

* * * * *